United States Patent [19]

Shifflett et al.

[11] Patent Number: 4,631,212
[45] Date of Patent: Dec. 23, 1986

[54] MANIFOLD

[75] Inventors: David C. Shifflett; Dennis I. Shifflett, both of Mt. Clemens, Mich.

[73] Assignee: Al-Ko Products, Inc., Fraser, Mich.

[21] Appl. No.: 729,234

[22] Filed: May 1, 1985

[51] Int. Cl.$^4$ ................................................ F16I 15/00
[52] U.S. Cl. ...................................... 428/36; 428/137;
428/138; 285/174; 285/219; 285/239; 285/289;
285/330; 285/390; 403/21; 403/118; 403/199;
403/401; 279/99
[58] Field of Search .................... 428/36, 137, 188;
285/174, 219, 221, 239, 289, 291, 292, 330, 337,
390, 399; 403/21, 22, 24, 118, 199, 401; 279/99,
101

[56] References Cited

U.S. PATENT DOCUMENTS 3,847,418 11/1974 Semprevivo et al. ............... 285/219
4,130,138 12/1978 Swanstrom ......................... 138/109

Primary Examiner—J. E. Kittle
Assistant Examiner—Patrick J. Ryan
Attorney, Agent, or Firm—Krass & Young

[57] ABSTRACT

A manifold formed of a plastic main body member and a plurality of tubular metal inserts. The metal inserts are received in bosses formed at longitudinally spaced locations along the plastic main body member and provide communication therethrough with the interior of the main body member. Each insert includes a wrenching portion at its inner end which coacts with the adjacent material of the plastic member to preclude turning of the insert in the respective boss upon torquing of a threaded member into the insert and each insert further includes an annular groove adjacent the wrenching portion to preclude axial movement of the insert within the boss. A method of forming the manifold is also disclosed in which the inserts are respectively positioned on a plurality of longitudinally spaced upstanding pins on a lower mold half to locate the inserts within the mold during the molding process. The inner ends of the inserts are provided with a camming surface which engages the leading end of the mandrel of the mold apparatus as the mandrel is inserted into the mold apparatus to push successive inserts outwardly into firm seating engagement with the outer surface of the mold.

4 Claims, 6 Drawing Figures

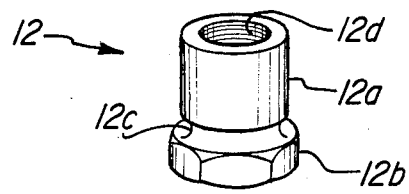
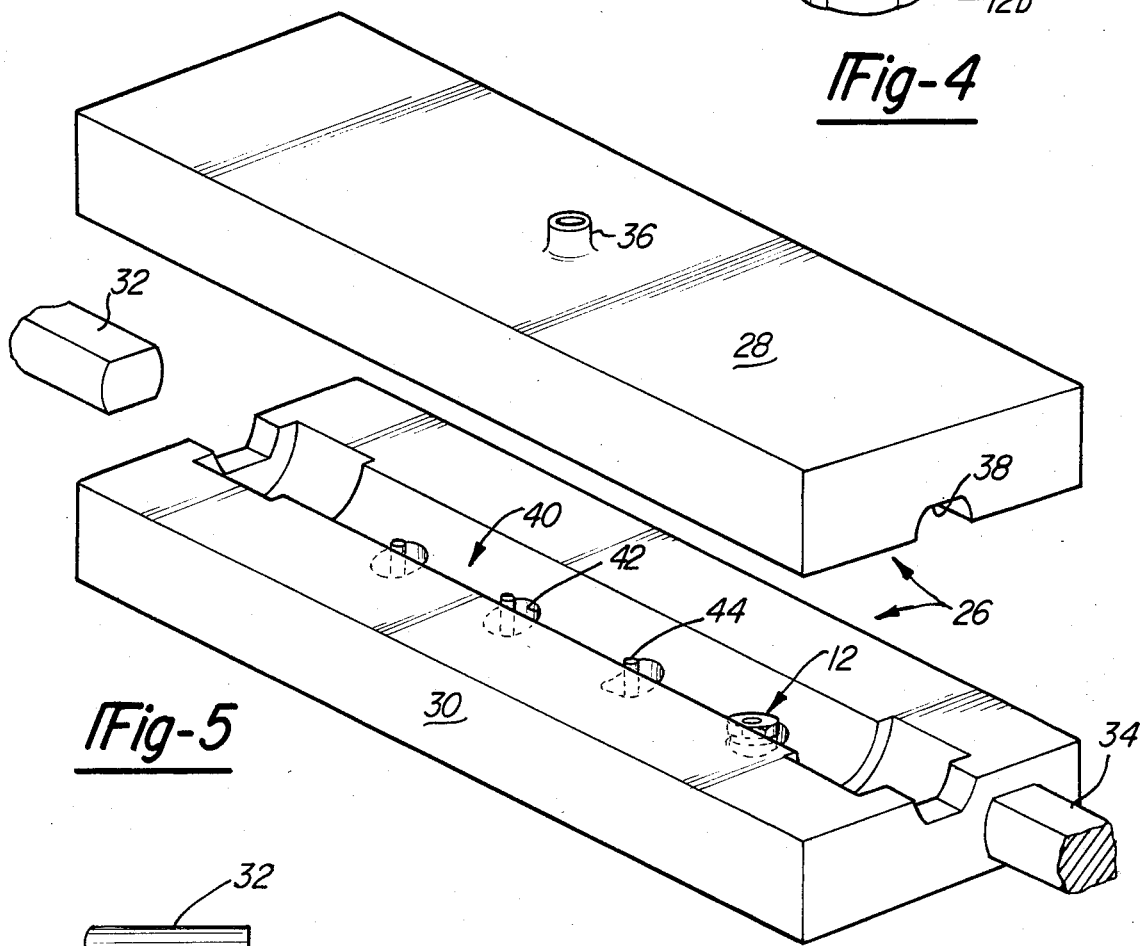
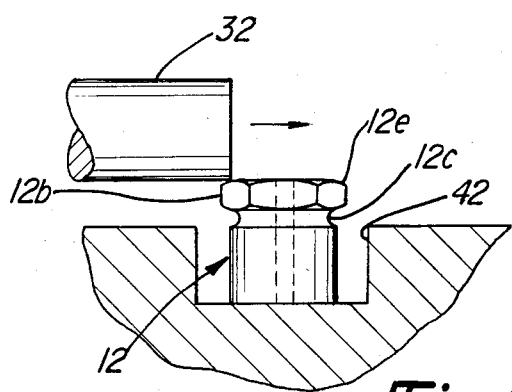

MANIFOLD

BACKGROUND OF THE INVENTION

This invention relates to manifolds and more particularly to manifolds formed generally of non-metallic materials.

Manifolds traditionally have been formed of steel or other metal materials. Whereas steel manifolds have proved to be generally satisfactory in most applications, they tend to be relatively expensive both because of the expensive nature of the material involved and the expensive nature of the operations required to form the metal manifold. Metal manifolds are also subject to corrosion, particularly when used in a liquid environment. Attempts have been made in the past to use less expensive materials in place of the relatively expensive steels traditionally used. For example, manifolds have been formed of various types of plastic and fibrous materials. Whereas these non-metallic manifolds have offered a price advantage as compared to steel manifolds, they have often proven to be not as serviceable or as durable as the steel manifolds and, in particular, have not been capable of sustaining the required torque loads at the various interconnections to the manifold over extended periods of usage.

BRIEF SUMMARY OF THE INVENTION

This invention is directed to the provision of a plastic manifold which is substantially less expensive than comparable steel manifolds and yet which retains all of the strength and durability characteristics of steel manifolds.

The invention manifold includes a plastic main body member including an elongated tubular portion and a plurality of transverse bores extending transversely through the wall of the tubular portion at longitudinally spaced locations therealong and opening in the central longitudinal bore of the tubular portion. A metal tubular insert is received in each transverse bore and means are provided on the exterior of each insert to interlockingly engage the adjacent material of the plastic member to preclude turning of the insert in the respective transverse bore upon torquing of a threaded member into the insert. This composite arrangement retains substantially all of the cost advantages of the plastic manifold while providing the strength and durability advantages of the steel manifold.

According to a further feature of the invention, the inserts are interlockingly engaged with the material of the plastic member by virtue of a wrenching head formed on each insert at the inner end of the insert adjacent the longitudinal bore. In the disclosed embodiment of the invention, this interlocking feature is further augmented by an exterior annular groove formed on each insert between the wrenching head and the outer end of the insert. The wrenching head thus functions to preclude turning movement of the insert in the respective transverse bore in the plastic main body member and the annular groove functions to preclude axial movement of the insert in the transverse bore.

According to a further feature of the invention, the longitudinal bore of the tubular plastic member is generally cylindrical but is flatted in the region where the transverse bores enter the longitudinal bore so that the inner end of the wrenching head of the inserts may lie substantially flush in the flatted portion of the longitudinal bore.

The invention also embodies a novel method of forming a manifold. According to the invention method, a two-part mold is configured to form an elongated cylindrical space therebetween and having port openings in one of the mold halves at longitudinally spaced locations therealong; a tubular metal insert is placed within each port opening in concentrically spaced relation to the opening; a mandrel is inserted into the mold with the inner ends of the inserts abutting the mandrel; and molten plastic is injected into the mold to fill the annular space between the mandrel and the mold and fill the spaces between the port openings and the metal inserts to form a plastic manifold having a plurality of longitudinally spaced metal inserts integrally molded therewithin.

According to a further feature of the invention method, an upstanding pin is provided in each port opening of the one mold half in concentrically spaced relation to the opening and the inserts are placed on the pins so that the pins serves to accurately locate the inserts during the injection molding process.

According to a further feature of the invention method, an angled cam surface is provided on the inner end of each insert so that, as the mandrel is inserted into the mold, the leading edge of the mandrel cammingly coacts with the cam surfaces on successively encountered inserts to push the inserts successively outwardly into firm seating engagement with the outer mold wall.

BRIEF DESCRIPTION OF THE DRAWINGS

FIG. 4 is a perspective view of a metal insert used in the invention manifold;

FIG. 5 is an exploded view of a mold apparatus used in forming the invention manifold.

FIG. 6 is a schematic view showing the manner in which the inserts are positioned in the mold apparatus.

DETAILED DESCRIPTION OF THE PREFERRED EMBODIMENT

Figure 1:
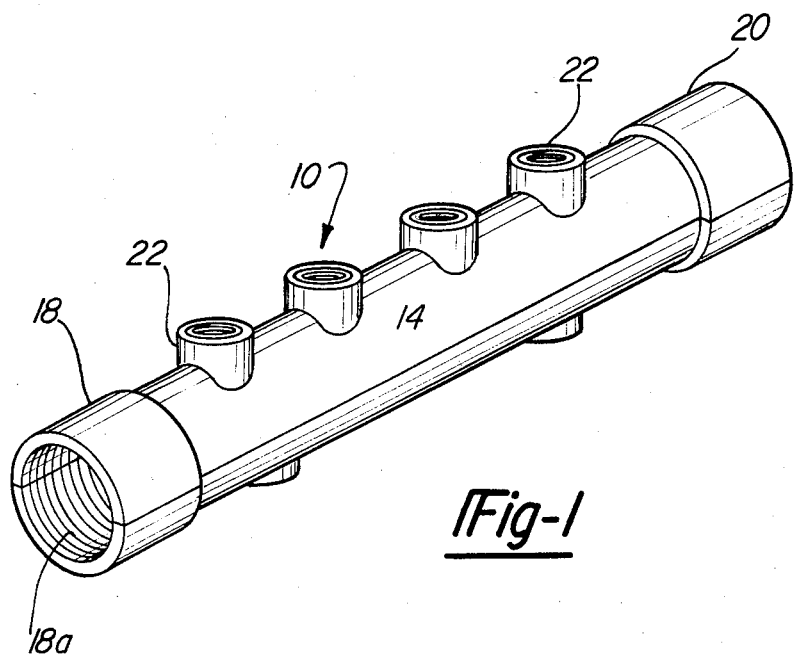
FIG. 1 is a perspective view of a manifold according to the invention.
Figure 2:
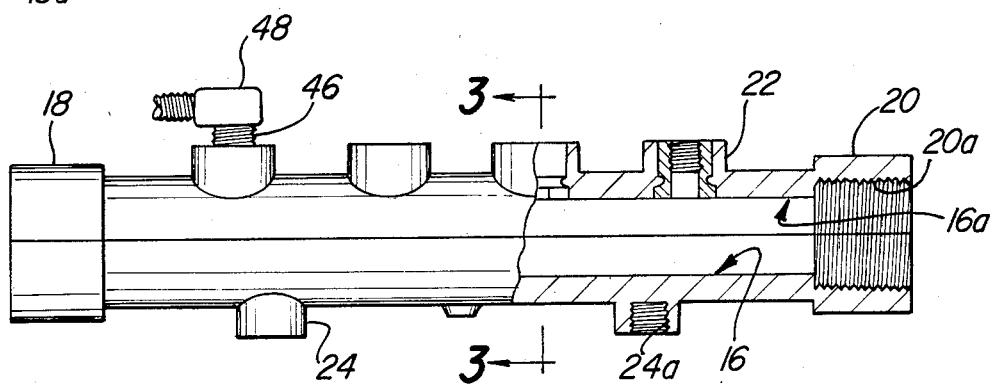
FIG. 2 is a fragmentary side view of the invention manifold.

The invention manifold, broadly considered, comprises a plastic main body member seen generally at 10 and a plurality of inserts seen generally at 12. Main body member 10 may be formed of any suitable lightweight corrosion resistant plastic material such for example as Nylon. Main body member 10 includes an elongated tubular portion 14 defining a longitudinal bore 16; main supply end portions 18 and 20; a plurality of transversely extending tubular bosses 22 formed at longitudinally spaced locations along elongated tubular portion 14; and spaced mounting bosses 24 having threaded inner peripheries 24a for mounting the manifold on the associated equipment.

Each tubular insert 12 is formed of a suitable steel material and includes a smooth walled cylindrical outer portion 12a, a wrenching head portion 12b at its inner end, an annular groove 12c at the intersection of cylindrical portion 12a and wrenching head portion 12b, and a threaded interior periphery 12d.

Figure 3:
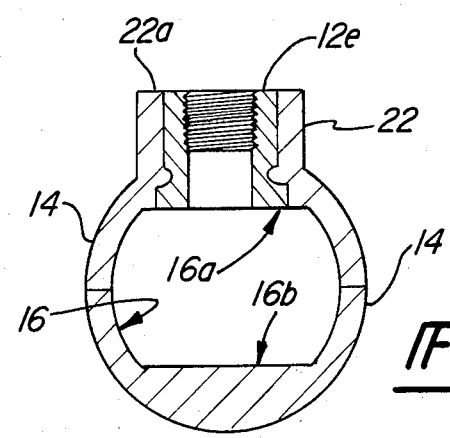
FIG. 3 is a cross sectional view taken on line 3—3 of FIG. 2.

As best seen in FIG. 3, each insert 12 is received in a respective port 22 with the outer annular end 12e of the insert flush with the outer annular end 22a of the port and the inner end or wrenching head portion of the insert flush mounted in a flatted portion 16a of longitudinal bore 16. The opposite surface of bore 16 may also be flatted as seen at 16b. The wrenching head 12b of each insert interlockingly engages the adjacent material of plastic member 10 to preclude turning of the insert in the respective boss upon torquing of a threaded connecting member into the insert and the annular groove 12c interlockingly engages the adjacent material of plastic member 10 to preclude axial movement of the insert relative to the associated boss.

FIG. 5 depicts a mold assembly, seen generally at 26, for use in forming the invention manifold. Mold assembly 26 includes an upper mold half 28, a lower mold half 30, a left mandrel 32, and a right mandrel 34.

Upper mold half 28 is of conventional form and includes a sprue 36 and a central longitudinal cavity 38. Lower mold half 30 includes a central cavity 40; a plurality of longitudinally spaced circular port openings 42; and an upstanding pin 44 positioned concentrically within each port opening 42.

Left and right mandrels 32 and 34 are of known form and include flats on their upper and lower surfaces corresponding to the flatted regions 16a, 16b of longitudinal bore 16 of tubular main body portion 14.

In use, an insert 12 is positioned over each pin 44 to accurately locate the insert within the respective port opening 42; upper mold half 28 is positioned over lower mold half 30; and mandrels 32 and 34 are respectively inserted into the opposite ends of the mold to define an annular space between the mandrels and the mold surfaces. As the mandrels move into the mold, and as best seen in FIG. 6, the leading edges of the mandrels successively engage angled cam surfaces 12e on the inner ends of the wrenching portions 12b of the inserts so that the advancing mandrels cammingly coact with the cam surfaces on successively encountered inserts to push the inserts outwardly into firm seating engagement with the outer mold wall. After the mold has been closed and the mandrels inserted, liquid plastic material is injected into the mold through sprue 36. The liquid plastic fills the annular space between the mandrels and the mold and the annular spaces between the inserts and the port openings 42 to form the invention plastic manifold with the metal inserts integrally molded therewithin. After the plastic has set up, the mold is opened, the manifold is withdrawn, and main supply ends 18 and 20 are suitably tapped to form main supply threads 18a and 20a. The invention manifold is now ready for use in the desired environment.

In use, the manifold is mounted to the adjacent equipment by the use of threaded mounting bosses 24 and the desired manifolding connections are made by the use of nipples 46 and fittings 48.

The invention manifold will be seen to provide a simple and effective composite structure which combines the cost advantages of a plastic manifold with the durability and torque handling characteristics of a steel manifold. The invention will also be seen to disclose a novel method for forming the invention manifold.

Whereas a preferred embodiment of the invention has been illustrated and described in detail it will be apparent that various changes may be made in the disclosed embodiment without departing from the scope or spirit of the invention.

We claim:

1. A manifold comprising:
(A) a plastic member including an elongated tubular portion having a generally cylindrical bore, means defining a longitudinally extending flatted surface on the inside of said tubular portion, and a plurality of transverse bores extending transversely through the wall of said tubular portion at longitudinally spaced locations therealong and opening at their inner ends in said flatted surface and at their outer ends in an exterior surface of said plastic member;
(B) a metal tubular insert, including a flat polygonal head portion having a flat annular end surface and a tubular body portion, received in each transverse bore with the central axis of the insert generally perpendicular to the central axis of said tubular portion and said flat annular end surface of said polygonal head portion flush mounted in said flatted surface; and
(C) thread means on the interior of each insert for receipt of a threaded member therein.

2. A manifold according to claim 1 wherein:
(D) each insert further includes an exterior annular groove between said polygonal head portion and said tubular portion.

3. A manifold according to claim 1 wherein:
(D) said plastic member further includes a plurality of bosses extending outwardly from the exterior surface of said tubular portion at longitudinally spaced locations therealong;
(E) said transverse bores are respectively formed within and extend centrally through said bosses;
(F) the outward annular ends of said bosses define a plurality of longitudinally spaced annular flat surfaces lying in a common plane parallel to the plane of said flatted surface;
(G) said tubular body portion of each insert terminates in a flat annular end surface; and
(H) said flat annular end surfaces of said tubular body portions are flush mounted in respective annular flat surfaces defined by the outward ends of said bosses.

4. A manifold according to claim 1 wherein:
(D) each insert is generally cylindrical, said tubular body portion comprises a smooth cylindrical wall portion adjacent its outer end, said polygonal head portion comprises a wrenching head portion adjacent its inner end, and each insert further includes an annular groove at the intersection of said smooth wall portion and said wrenching head portion; and
(E) said wrenching head portion and said annular groove lockingly interengage with the adjacent material of said plastic member to preclude turning of the insert in the respective transverse bore upon torquing of a threaded member into the insert.

* * * * *